United States Patent
Mampe

(10) Patent No.: US 10,279,768 B2
(45) Date of Patent: May 7, 2019

(54) SEAT SIDE AIRBAG STRUCTURE, AND METHODS OF USE AND MANUFACTURE THEREOF

(71) Applicant: Honda Motor Co., Ltd., Tokyo (JP)

(72) Inventor: Christopher Mampe, Delaware, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 52 days.

(21) Appl. No.: 15/402,957

(22) Filed: Jan. 10, 2017

(65) Prior Publication Data
US 2018/0194316 A1 Jul. 12, 2018

(51) Int. Cl.
*B60R 21/207* (2006.01)
*B60N 2/68* (2006.01)
*B60N 2/90* (2018.01)
*B60R 21/16* (2006.01)
*B60R 21/231* (2011.01)

(52) U.S. Cl.
CPC .............. *B60R 21/207* (2013.01); *B60N 2/68* (2013.01); *B60N 2/986* (2018.02); *B60R 2021/161* (2013.01); *B60R 2021/23146* (2013.01); *B60Y 2306/01* (2013.01)

(58) Field of Classification Search
CPC ............ B60R 21/207; B60R 2021/161; B60R 2021/23146; B60N 2/986; B60N 2/68; B60Y 2306/01
See application file for complete search history.

(56) References Cited

U.S. PATENT DOCUMENTS

| | | | |
|---|---|---|---|
| 6,089,595 A | 7/2000 | Enders | |
| 6,422,590 B1 | 7/2002 | Umezawa et al. | |
| 6,439,597 B1 | 8/2002 | Harada et al. | |
| 7,393,005 B2 | 7/2008 | Inazu et al. | |
| 8,075,053 B2 | 12/2011 | Tracht et al. | |
| 8,226,113 B2 | 7/2012 | Yamashita | |
| 9,079,556 B2 | 7/2015 | Tanabe et al. | |
| 2006/0113772 A1* | 6/2006 | Tracht | B60R 21/207 280/730.2 |
| 2011/0285116 A1* | 11/2011 | Gumprecht | B60R 21/207 280/730.2 |
| 2014/0312664 A1* | 10/2014 | Tanabe | B60R 21/207 297/216.13 |
| 2015/0151704 A1* | 6/2015 | Ko | B60R 21/203 280/728.3 |
| 2015/0166003 A1* | 6/2015 | Fujiwara | B60R 21/207 280/730.2 |

(Continued)

*Primary Examiner* — Darlene P Condra
(74) *Attorney, Agent, or Firm* — Kenealy Vaidya LLP

(57) ABSTRACT

Some embodiments are directed to a guide structure for use with a deployable airbag assembly of a vehicle seat, the vehicle seat having a frame extending therein. The guide structure can include an elongated plate configured to be connected to at least one of the frame and the airbag assembly such that the plate extends along an exterior thereof, the plate including: a first end configured to be connected to the at least one of the frame and the airbag assembly by a fastener; and a second end configured to be inserted through a slot in the at least one of the frame and the airbag assembly so as to be disposed within an interior thereof. The guide structure can also include a sheet connected to the plate, the sheet configured to thereby guide deployment of the airbag assembly.

20 Claims, 6 Drawing Sheets

(56) References Cited

U.S. PATENT DOCUMENTS

2015/0239374 A1 8/2015 Jeong et al.
2015/0336528 A1* 11/2015 Tanabe .................. B60R 21/207
                                                    280/728.2
2016/0325646 A1* 11/2016 Tanabe .................... B60N 2/42

* cited by examiner

SEAT SIDE AIRBAG STRUCTURE, AND METHODS OF USE AND MANUFACTURE THEREOF

BACKGROUND

The disclosed subject matter is directed to a seat side airbag structure, and methods of use and manufacture thereof. More particularly, the disclosed subject matter is directed to methods and apparatus for enhancing directed deployment of an airbag assembly in a vehicle.

Many types of vehicles include seats, which provide support for occupants seated therein. However, vehicles can be involved in crashes and other impact events. These impact events can cause harm to vehicle occupants positioned in seats, such as by displacement of the occupants or collision with foreign objects or parts of the vehicle. This potential harm to occupants can be influenced by a variety of factors, including implementation of seat belts and airbag assemblies, some airbag assemblies being disposed with the seats of the vehicle.

SUMMARY

According to one aspect, a guide structure is configured for use with a deployable airbag assembly of a vehicle seat, the vehicle seat having a frame extending therein. The guide structure includes an elongated plate configured to be connected to at least one of the frame and the airbag assembly such that the plate extends along an exterior thereof, the plate including. The plate has a first end configured to be connected to the at least one of the frame and the airbag assembly by a fastener. The plate also has a second end configured to be inserted through a slot in the at least one of the frame and the airbag assembly so as to be disposed within an interior thereof. The guide structure further includes a sheet connected to the plate, the sheet configured to thereby guide deployment of the airbag assembly.

According to another aspect, an elongated plate is configured for use with a deployable airbag assembly of a vehicle seat, the vehicle seat having a frame extending therein, the plate configured to be connected to at least one of the frame and the airbag assembly such that the plate extends along an exterior thereof, and a sheet being configured to be connected to the plate to thereby guide deployment of the airbag assembly. The plate includes a first end configured to be connected to the at least one of the frame and the airbag assembly by a fastener. The plate also includes a second end configured to be inserted through a slot in the at least one of the frame and the airbag assembly so as to be disposed within an interior thereof.

According to yet another aspect, a method is provided for installing a guide structure for use with a deployable airbag assembly in a vehicle seat, the vehicle seat having a frame extending therein. The method includes: connecting an elongated plate to at least one of the frame and the airbag assembly such that the plate extends along an exterior thereof, the plate including: a first end configured to be connected to the at least one of the frame and the airbag assembly by a fastener; and a second end configured to be inserted through a slot in the at least one of the frame and the airbag assembly so as to be disposed within an interior thereof; wrapping a portion of a sheet around an inboard side of the plate such that a portion of the plate is partially covered by the overlapping sheet; and attaching the sheet to another portion thereof to secure the sheet around the plate, the sheet configured to thereby guide deployment of the airbag assembly.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Various headings are provided below for convenience and clarity. However, these headings are not intended to limit the scope or content of the disclosure, and/or the scope of protection afforded the various inventive concepts disclosed herein.

I. Overall Seat

Figure 1:
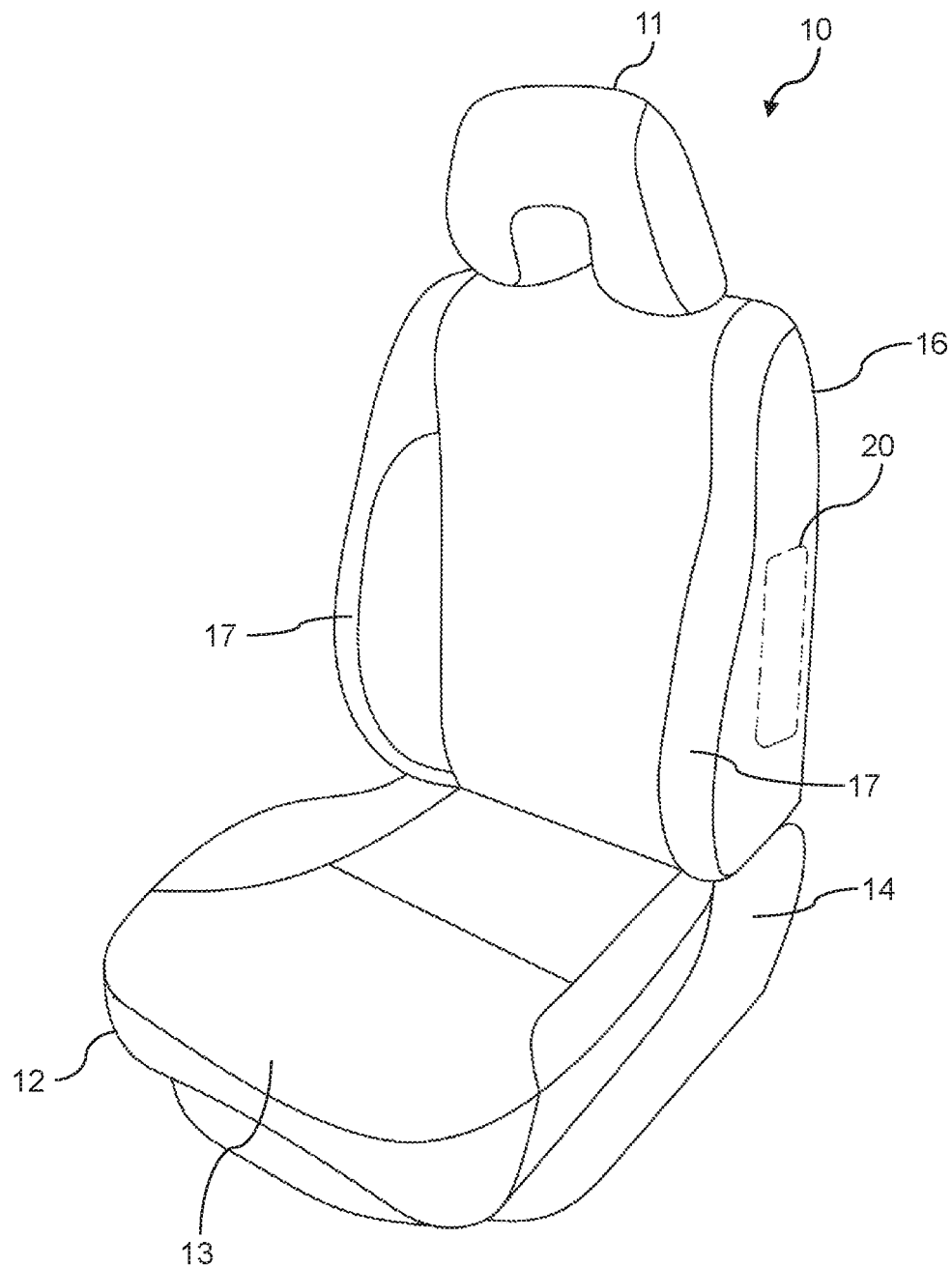
FIG. 1 is a perspective view of an exemplary vehicle seat in accordance with the disclosed subject matter.

FIG. 1 is a perspective view of an exemplary vehicle seat 10 in accordance with the disclosed subject matter. The seat 10 shown in FIG. 1 is primarily for use with passenger vehicles operated on paved roadways. The seat 10 may also be for use with off-road vehicles for use on unpaved roadways consisting of gravel, dirt, sand, etc.

However, the disclosed seat 10 can be used with any vehicle that is configured for travel along any one or combination of improved, unimproved, and unmarked roadways and paths consisting of gravel, dirt, sand, etc. For example, embodiments are intended to include or otherwise cover any type of automobile seat, including passenger car, minivan, truck, etc. In fact, embodiments are intended to include or otherwise cover configurations of the seat 10 for use in any other type of vehicle, such as an aircraft, boat, ship, train, spacecraft, etc. Some other embodiments can be used in non-vehicular applications, such as for amusement park rides, gondolas, or any other situation where an airbag may be provided to protect seat occupants from harm.

The seat 10 can include a seat bottom 12, a seat back 16, a seat base 14, a cushion 13, a pair of bolsters 17, a headrest 11, and an airbag guide structure 20. The airbag guide structure 20 can be disposed within at least one of the pair of bolsters 17.

II. Airbag Guide Structure

Figure 2A:
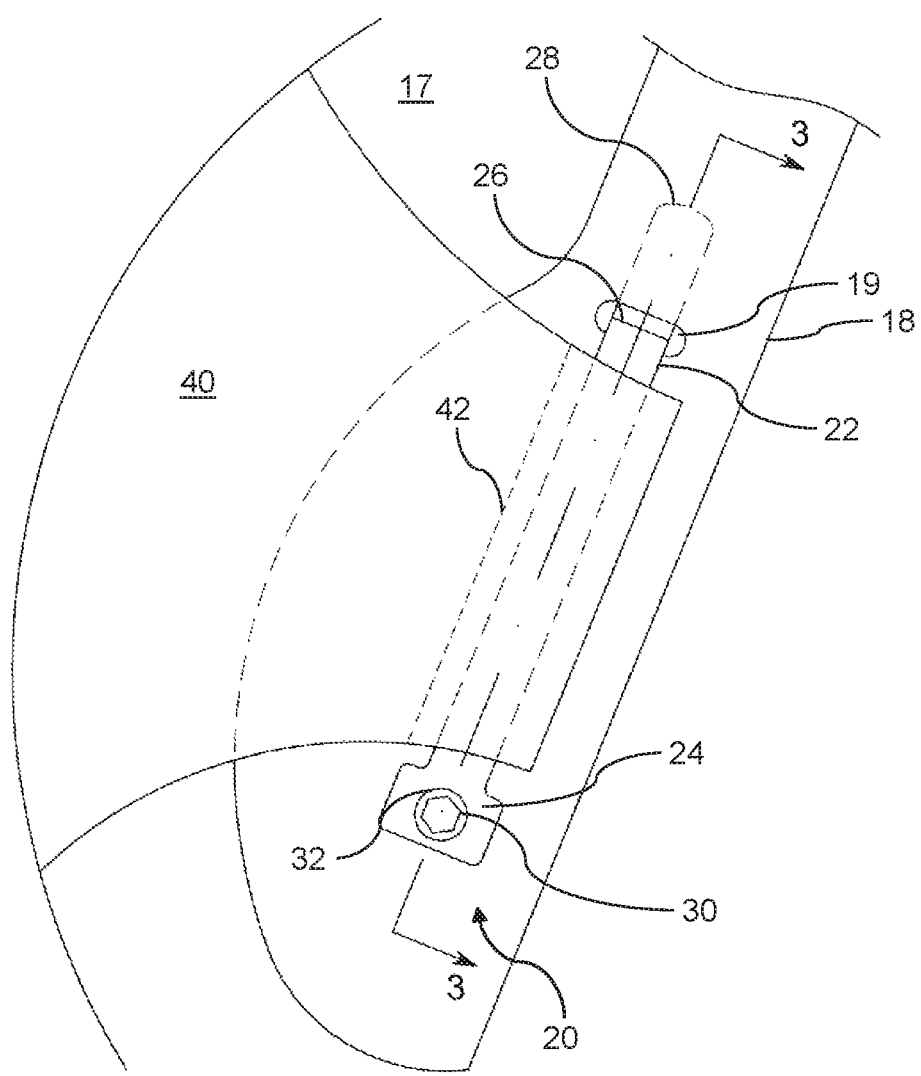
FIG. 2A is an outboard side view of an exemplary airbag guide structure of the vehicle seat in accordance with the disclosed subject matter.

FIG. 2A is a side view of an exemplary airbag guide structure 20 of the vehicle seat 10 in accordance with the disclosed subject matter. Particularly, the airbag guide structure 20 shown in FIG. 2A is configured to be connected to a frame 18 extending within the side bolster 17 of seat 10. The airbag guide structure 20 can be connected to an end portion of the frame 18 so as to facilitate deployment of the seat side airbag.

The airbag guide structure 20 can include an elongated plate 22 extending along the frame 18, the elongated plate 22 being configured to be connected to the frame 18. The elongated plate 22 can have a fixture end 24 disposed proximate an end of the frame 18, and a slot end 28 opposite the fixture end 24. The plate 22 may thereby be connected to the frame 18 via at least one of the fixture end 24 and the slot end 28.

The fixture end 24 of the plate 22 can be configured such that a mechanical fastener such as a bolt 30 may be inserted therethrough to connect the fixture end 24 to the frame 18. The bolt 30 may additionally have spacer 32, such as a washer, threaded thereon to space an underside of a head of the bolt 30 from an upper surface of the fixture end 24 proximate the bolt 30. In some embodiments, other mechanical fasteners such as clips, adhesives, etc. may be used, and any number of bolts or other fasteners can be included. The fixture end 24 can also be configured to have increased width relative to an intermediate portion of the plate 22. The intermediate portion of the plate 22 may therefore extend from the fixture end 24 along the frame 18 to the slot end 28 of the plate 22.

The slot end 28 can be configured so as to include a bend portion 26 by which the slot end 28 is connected to the intermediate portion of the plate 22. The slot end 28 can be stepped from the intermediate portion via the bend portion 26. Particularly, the bend portion 26 can be inserted through a slot 19 in the frame 18 such that the stepped slot end 28 extends within the frame 18. The bend portion 26 can be formed as an approximately perpendicular extension from the intermediate portion of the plate 22, the slot end 28 extending approximately perpendicularly from an end of the bend portion 26 opposite the end joined to the intermediate portion. The intermediate portion and the end slot 28 can therefore extend parallel to each other, separated by a distance equal to a length of the bend portion 26. In some instances, the intermediate portion, the bend portion 26, and the slot end 28 can be formed from as a contiguous plate bent so as to be stepped at the bend portion 26. As described above, bends at both ends of the bend portion 26 may be approximately orthogonal, or alternatively may be bent at varied angles.

The slot 19 in the frame 18 into which the bend portion 26 of the plate 22 may be configured such that the slot end 28 can be inserted therethrough so as to dispose the slot end 28 within the interior of the frame 18. The slot end 28 thereafter extends within the frame 18, while the bend portion 26 is disposed within the slot 19 serving as a stepped transition between the intermediate portion and the slot end 28 of the plate 22. In some embodiments, the plate 22 can be secured to the slot 19 by a mechanical fastener such as a bolt, clip, adhesive, etc. rather than simply having the slot end 28 and the bend portion 26 fitted therein, and any number of such fasteners can be used in securing the plate 22. Additional fasteners between the plate 22 and the frame 18 can serve to impede vibration and noise of these components during operation of a vehicle in which the seat 10 is located.

The airbag guide structure 20 can be configured to include a sheet 40 wrapped around the intermediate portion of the plate 22. The sheet 40 can extend from the plate 22 along the side bolster 17 such that the sheet 40 may guide deployment of the side airbag from the airbag module. An end of the sheet 40 wrapped around and underneath the plate 22 may be attached to an intermediate portion of the sheet 40 such that the plate 22 is therein surrounded. The end of the sheet 40 may be sewn to itself via stitching 42 extending along the plate 22 so as to encircle the plate 22 within a portion of the sheet 40 proximate the end. The sheet 40 is thereby secured around the plate 22 and is impeded from sliding off of either end of the plate 22 by the fixture end 24 and the slot end 28, respectively.

Figure 2B:
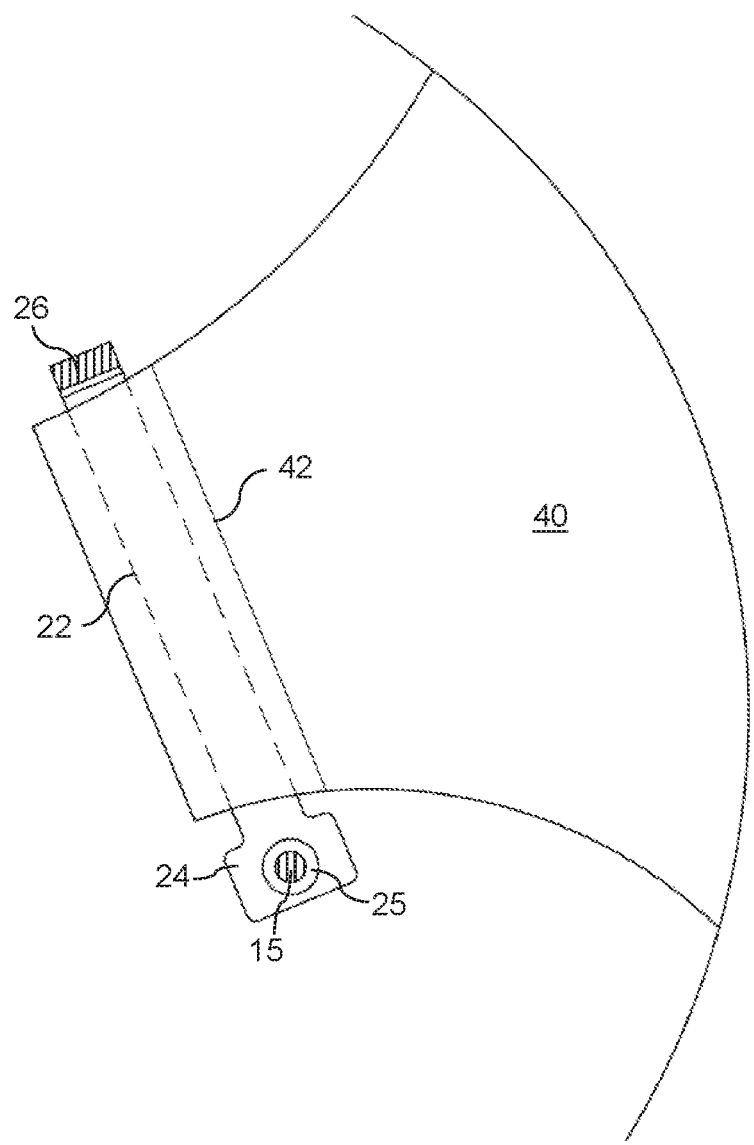
FIG. 2B is an inboard side view of the airbag guide structure of FIG. 2A in accordance with the disclosed subject matter.

FIG. 2B is an inboard side view of the airbag guide structure 20 shown FIG. 2A and described above. The sheet 40 is configured to extend over an outboard surface of the plate 22 and then wrap around an edge of the plate 22 to extend back under the plate 22. The sheet 40 thereby covers an inboard surface of the plate 22 and extends past an opposing edge of the plate 22 such that overlapping portions of the sheet 40 spaced from the plate 22 can be attached to each other. Thus, in the present embodiment the sheet 40 is looped around the plate 22 in an inboard direction to wrap around the inboard surface of the plate 22 and thereby secure the sheet 40 to the plate 22. As described above, the overlapping portions of the sheet 40 may then be attached by stitching or any other appropriate method including adhesives and hook-and-loop configurations.

Figure 3:
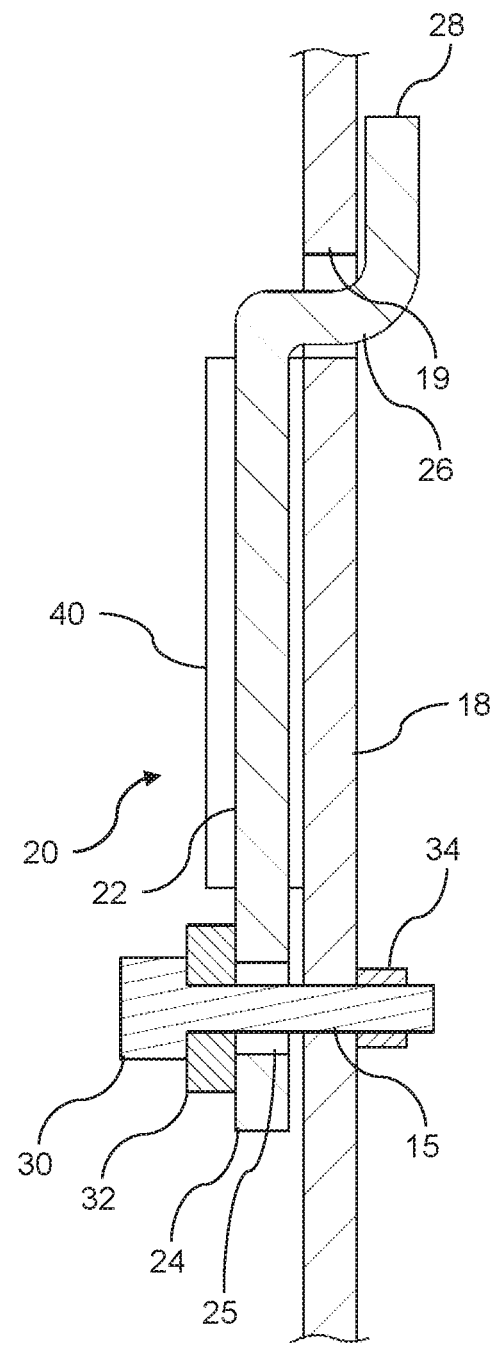
FIG. 3 is a cross-section view of the airbag guide structure of FIG. 2A.

FIG. 3 is a cross-section view of the airbag guide structure 20 of FIG. 2A. The plate 22 of the airbag guide structure 20 shown in FIG. 2A extends along the frame 18 and is secured thereto at both the fixture end 24 and the slot end 28.

The fixture end 24 can have a plate aperture 25 disposed therein, the plate aperture 25 configured to overlap and align with a frame aperture 15 in the frame 18. The bolt 30 may thus be inserted through the aligned plate aperture 25 and frame aperture 15 to thereby secure the fixture end 24 of the plate 22 to the frame 18. In the present embodiment, a shaft of the bolt 30 may have a nut 34 threaded thereon, the nut 34 disposed within the interior of the frame 18. The nut 34, in conjunction with the head of the bolt 30, can thus be configured to clamp the plate 22 and the frame 18 together. The bolt 30 can additionally have the spacer 32 threaded thereon adjacent the head of the bolt 30 to provide a buffer between the head of the bolt 30 and the plate 22.

The intermediate portion of the plate 22 between the fixture end 24 and the bend portion 26 can extend approximately parallel to and along the exterior surface of the frame 18. In some instances, the intermediate portion of the plate 22 may be spaced from the frame 18, while other instances may include the intermediate portion in contact with the frame 18. The sheet 40, as described above, can be configured to wrap around the intermediate portion. The sheet 40 may thus be disposed between the fixture end 24 and the bent portion 26 of the plate 22.

The bend portion 26 can extend approximately perpendicular from the intermediate portion of the plate 22 opposite the fixture end 24. The bend portion 26 may thereby extend through the slot 19 in the frame 18 to enter the interior of the frame 18. The slot end 28 of the plate 22 is disposed therein, and may extend approximately perpendicular from the bend portion 26 opposite the intermediate portion. The slot end 28 can thereby be disposed within the interior of the frame 18 while extending along an underside thereof parallel to the intermediate portion. The slot end 28 may thus extend away from the intermediate portion a distance relatively less than that which the intermediate portion extends. In some embodiments, the slot end 28 may alternatively extend a distance equal to or greater than a distance of extension of the intermediate portion. Additionally, the slot end 28 may be spaced from an underside surface of the frame 18, while in other embodiments the slot end 28 may be in contact with the frame 18.

In some embodiments such as that shown in FIG. 3, the plate 22 can be formed as a contiguous plate having uniform thickness. The plate 22 can thus have bends formed at both ends of the bend portion 26, the bends creating the stepped feature. The bends at the bend portion 26 can have varying curve radii such that the bend between the slot end 28 and the bend portion 26 mat be more gradual than that between the bend portion 26 and the intermediate portion of the plate 22. In other embodiments, the degree and severity of bend between the aforementioned components may be varied.

III. Plate Embodiments

Figure 4A:
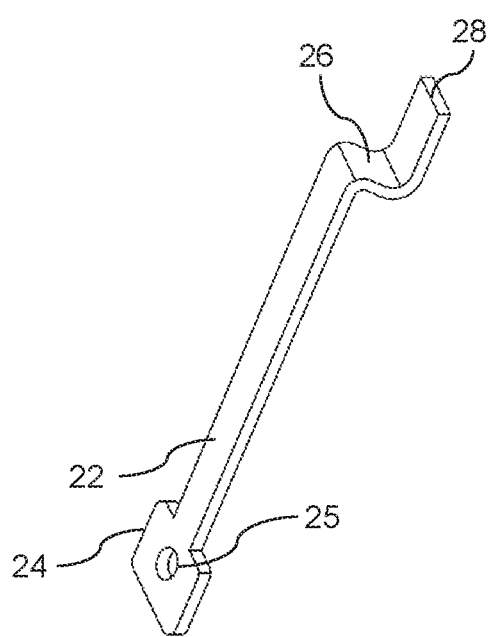
FIG. 4A is a perspective view of an exemplary force bar of the airbag guide structure in accordance with the disclosed subject matter.

FIG. 4A is a perspective view of the exemplary plate 22 of the airbag guide structure 20 in accordance with the disclosed subject matter. The plate 22 shown in FIG. 4A can be configured to include the intermediate portion and the fixture end 24 and slot end 28 opposite each other. This embodiment of the plate 22, as described above, can include the bend portion 26 connecting the slot end 28 to the intermediate portion. Additionally, the fixture end of the plate 22 shown can be relatively wider than the intermediate portion.

Figure 4B:
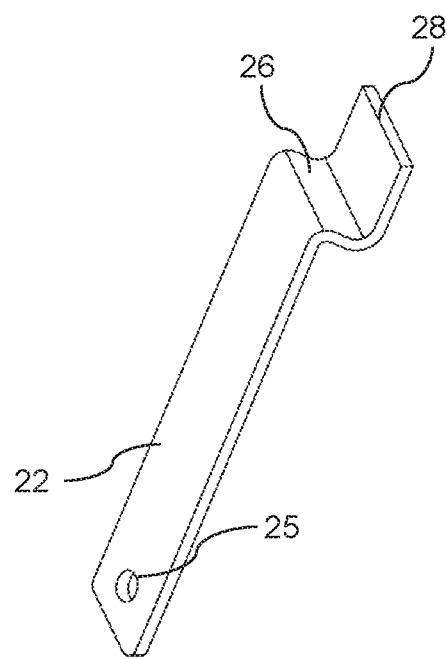
FIG. 4B is a perspective view of an exemplary force bar of the airbag guide structure in accordance with the disclosed subject matter.

FIG. 4B is a perspective view of an alternate embodiment of the exemplary plate 22 of the airbag guide structure 20 in accordance with the disclosed subject matter. The plate 22 shown in FIG. 4B can be configured to have a uniform width throughout, such that relative widths of the fixture end 24, the intermediate portion, the bend portion 26, and the slot end 28 are approximately equal. Furthermore, the plate 22 shown in FIG. 4B is configured to have a relatively larger width throughout a majority of the plate 22 compared to previously described embodiments. The increased width may provide enhanced structural rigidity and contact areas, among other things.

Figure 4C:
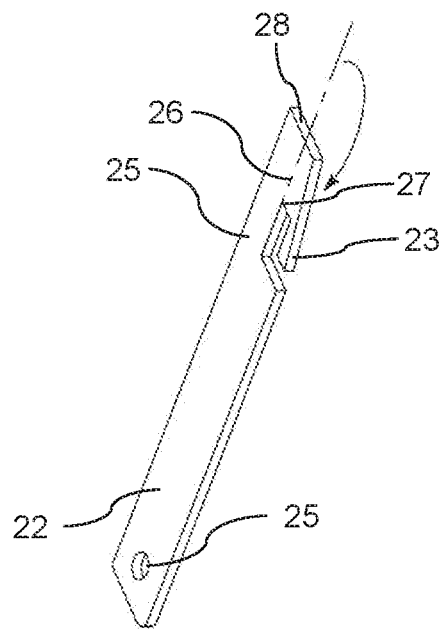
FIG. 4C is a perspective view of an exemplary force bar of the airbag guide structure in accordance with the disclosed subject matter.

FIG. 4C is a perspective view of an alternate embodiment of the exemplary plate 22 of the airbag guide structure 20 in accordance with the disclosed subject matter. The plate 22 shown in FIG. 4C can include the slot end 28 extending linearly from the intermediate portion. The slot end 28 may therefore not be stepped from the intermediate portion by the bend portion 26, rather the bend portion 26 can be disposed along the slot end 28 in a longitudinal direction defined by the direction of extension of the plate 22. Thus the bend portion 26 may be configured to facilitate bending of a hook portion 23 of the slot end 28, the hook portion 23 folding along the bend portion 26 towards the frame 18 to which the plate 22 is connected. The bend portion 26 can be configured such that the hook portion 23 extends perpendicular to the intermediate portion along the bend portion 26.

As will be described below and shown in FIGS. 5A-B, the hook portion 23 can be spaced from the intermediate portion by cutout 27. The cutout 27 of the present embodiment can be approximately L-shaped, however other embodiments may include otherwise shaped cutouts. The cutout 27 is configured to facilitate insertion of the hook portion 23 within the slot 19 of the frame 18 to secure the plate 22 to the frame 18.

IV. Slot End Embodiments

Figure 5A:
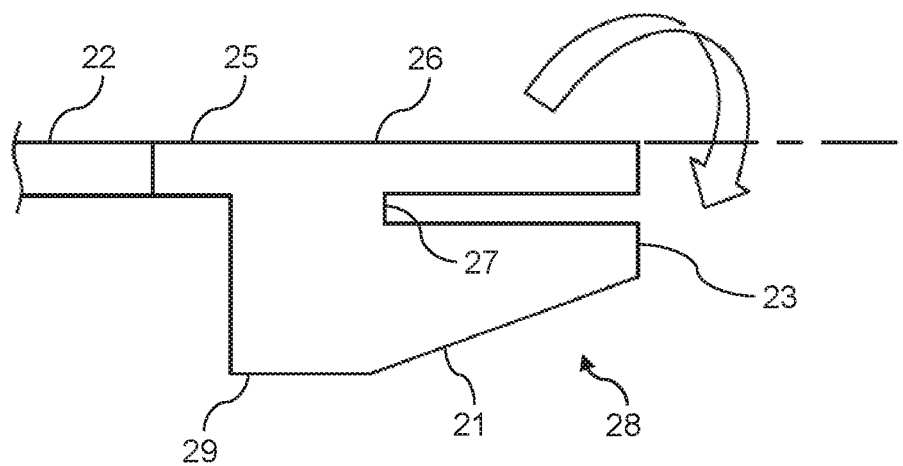
FIG. 5A is a side view of an exemplary hook end of the force bar in accordance with the disclosed subject matter.

FIG. 5A is a side view of an alternate slot end 28 of the plate 22 in accordance with the disclosed subject matter. The end slot 28 shown in FIG. 5A is configured to include the hook portion 23 extending therefrom, the hook portion 23 being spaced from the bend portion 26 by the cutout 27. The arrow shown in FIG. 5A can indicate a direction in which the hook portion 23 can be bent about the bend portion 26 so as to extend perpendicular to a linear portion of the slot end 28.

In the present embodiment, the end slot 28 is shown with the bend portion 26 bent perpendicular to the intermediate portion. The hook portion 23, extending from the bend portion 26, is therefore shown orthogonal to the intermediate portion of the plate 22. The embodiment of the end slot 28 shown in FIG. 5A includes a slanted edge transitioning the perpendicular hook portion 23 from a wider side to a narrower side as the hook portion 23 extends distally from the intermediate portion. Thus, the hook portion 23 is configured to be inserted into the slot 19 in the frame 18 by a side of the slot end 28 in which the cutout 27 is disposed. The cutout 27 can be sufficiently shaped such that a thickness of an upper wall of the frame 18 can be accommodated therein to secure the airbag guide structure 20 to the frame 18. The upper wall of the frame 18 being inserted into the cutout 27 therefore provides a locking feature at the slot end 28.

Figure 5B:
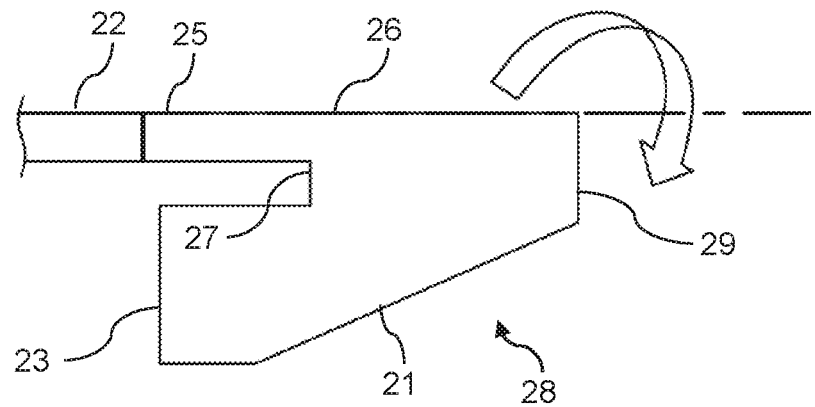
FIG. 5B is a side view of an exemplary hook end of the force bar in accordance with the disclosed subject matter.

FIG. 5B is a side view of an alternate slot end 28 of the plate 22 in accordance with the disclosed subject matter. The end slot 28 shown in FIG. 5A is configured to include the hook portion 23 extending therefrom, the hook portion 23 being spaced from the bend portion 26 by the cutout 27. The arrow shown in FIG. 5A can indicate a direction in which the hook portion 23 can be bent about the bend portion 26 so as to extend perpendicular to a linear portion of the slot end 28.

In the present embodiment, the end slot 28 is shown with the bend portion 26 bent perpendicular to the intermediate portion. The hook portion 23, extending from the bend portion 26, is therefore shown orthogonal to the intermediate portion of the plate 22. The embodiment of the end slot 28 shown in FIG. 5A includes a slanted edge transitioning the perpendicular hook portion 23 from a wider side to a narrower side as the hook portion 23 extends towards the intermediate portion. Thus, the hook portion 23 is configured to be inserted into the slot 19 in the frame 18 by a side of the slot end 28 in which the cutout 27 is disposed. The cutout 27 can be sufficiently shaped such that a thickness of an upper wall of the frame 18 can be accommodated therein to secure the airbag guide structure 20 to the frame 18. The upper wall of the frame 18 being inserted into the cutout 27 therefore provides a locking feature at the slot end 28.

The opposing facing orientations of the cutout 27 in the various embodiments shown in FIGS. 5A-B allow respective plates 22 to be inserted through the slot 19 in the frame 18 in a variety of directions and orientations. In some embodiments, it may be desirable to insert the hook portion 23 and hook the cutout 27 on opposing edges of the slot 19. Once the hook portion 23 and the cutout 27 of the plate 22 engage the slot 19 in the frame 18, the fixture end 24 can be secured to the frame via the bolt 30 at the frame aperture 15. Securing the plate 22 to the frame 18 by both the bolt 30 and the hook portion 23 and cutout 27 ensures the sheet 40 properly guides airbag deployment from the module.

V. Alternative Embodiments

While certain embodiments of the present disclosure are described above, and FIGS. 1-5B disclose the best mode for practicing the various aspects of the present disclosure, it should be understood that the present disclosure can be embodied and configured in many different ways without departing from the spirit and scope of the present disclosure.

For example, embodiments are disclosed above in the context of the airbag guide structure 20 of the vehicle seat 10 shown in FIGS. 1-5C. However, embodiments are intended to include or otherwise cover any type of seat having an airbag guide disposed therein for facilitating controlled deployment of an airbag, as disclosed above.

For example, exemplary embodiments are intended to include airbag guide structures 20 having an elongated plate 22 for both guiding deployment of an airbag from an airbag module and serving as a grounding path. The elongated plate 22 can alternatively be configured as a bar having a circular or oval cross-section. This airbag guide structure 20 can be connected to the frame 18 at opposing ends, the fixture end 24 being connected via a bolt and the slot end 28 being inserted into engagement with the slot 19 of the frame 18. This form of attachment ensures the guide sheet 40 wrapped around the plate 22 maintains relative position along the side bolster 17 of the seat 10 for proper airbag deployment.

In another embodiment, the airbag guide structure 20 can share attachment locations with the side airbag module and/or side air bag mounting plate/structure of the seat 10. For example, a side airbag inflator can share at least one attachment point with the plate 22 to which the fixture end 24 can be secured so that a fastener such as the bolt 30 can extend through respective holes in both the plate 22 and a side airbag inflator mounting point. The fixture end 24 of the plate 22 can be modified and shaped to overlap with the mounting point of the side air bag inflator in such an embodiment. In other embodiments, the sheet 40 can be attached to an existing side airbag plate. The existing side airbag plate can have a combination of holes and studs, with the holes configured for attachment of the airbag inflator and the studs configured for attachment to the frame 18.

In another embodiment, the sheet 40 can be wrapped completely around the plate 22 and sewn to a trim cover. In another alternate embodiment, attachment of the airbag guide structure 20 to the frame 18 may be at either end of the plate 22, or at the intermediate portion of the plate 22.

In fact, in some embodiments, the airbag guide structure 20 can include a plurality of plates 22 configured for attachment between the sheet 40 and the frame 18 of the seat 10. Furthermore, multiple sheets may be attached to the plurality of plates 22 of the airbag guide structure 20 such that the sheets 40 are configured to, in combination, guide deployment of the airbag from the airbag module. Multiple airbag modules may additionally be incorporated into assemblies such as a vehicle seat, the aforementioned airbag guide structures 20 and plurality of sheets 40 being configured to guide deployment of the multiple airbags to protect vehicle occupants in accordance with the disclosed subject matter.

In some embodiments, the plate 22 or bar can be straight for ease of manufacturing and attachment to the frame 18, as described above. In such embodiments, the sheet 40 can be formed in a pattern designed to fit the particular application of the airbag guide structure 20 to the seat 10. However, other embodiments can include the plate 22 or bar having a bend so as to be curved to form an angle with the disposition of the sheet 40. For example, the plate 22 or bar can be bent at an angle normal to the sheet 40. Such curved configurations of the plate 22 or bar can facilitate ease of trim cover assemblies or improved performance of the airbag guide structure 20. Some embodiments that incorporate multiple sheets attached to a plate 22 or bar can feature a bent plate 22 or bar to accept various angles of attachment for respective sheets, as described above. For example, a first portion of the plate 22 or bar may extend from a second portion at a specified angle such that the first and second portions are approximately straight, facilitating attachment of the respective sheets to the first and second portions of the plate 22 or bar while maintaining different angles of attachment of the sheets.

All or some of the alternative structures disclosed above with regard to the airbag guide structures 20 also apply to non-vehicular seat applications. The above alternative configurations of the airbag guide structures 20, and specifically the plates 22 and connected sheets 40, are merely provided for exemplary purposes, and as indicated above, embodiments are intended to cover any type of seat having an airbag guide disposed therein for facilitating controlled deployment of an airbag that operate or otherwise perform as disclosed above. Embodiments are also intended to include or otherwise cover any alternative or additional guide members that are structured and disposed to perform as disclosed above with regard to the plate 22 and sheet 40.

As disclosed above, embodiments are intended to be used with any type of vehicle seat. The seat may be powered or manually adjustable, and may have a variety of ways to be adjusted such as overall position along the longitudinal direction of the vehicle, seat back tilt, lumbar support, bolster support, thigh support, headrest height, etc. The seat can also be covered in a variety of materials such as leather, synthetic leather, cloth, etc.

Embodiments of the vehicle seats are also intended to be used with any type of vehicle. The power source of the vehicle can be an internal combustion engine, an electric motor, or a hybrid of an internal combustion engine and an electric motor. The power source configured as an internal combustion engine or a hybrid power source can have the engine output axis oriented in the longitudinal direction or in the traverse direction of the vehicle. The engine can be mounted forward of the front axles, rearward of the rear axles, or intermediate the front and rear axles.

The vehicle can include any type of transmission, including an automatic transmission, a manual transmission, or a semi-automatic transmission. The transmission can include an input shaft, an output shaft, and a speed ratio assembly.

Embodiments are also intended to include or otherwise cover methods of using and methods of manufacturing any or all of the elements disclosed above. The methods of manufacturing include or otherwise cover processors and computer programs implemented by processors used to design various elements of the airbag guide structure disclosed above.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. A guide structure for use with a deployable airbag assembly of a vehicle seat, the vehicle seat having a frame extending therein, the guide structure comprising:
   an elongated plate configured to be connected to at least one of the frame and the airbag assembly such that the plate extends along an exterior thereof, the plate including:
      a first end configured to be connected to the at least one of the frame and the airbag assembly by a fastener;
      a second end configured to be inserted through a slot in the at least one of the frame and the airbag assembly so as to be disposed within an interior thereof; and
   a sheet connected to the plate, the sheet configured to thereby guide deployment of the airbag assembly.

2. The guide structure according to claim 1, wherein the second end is configured to be hooked on the slot so as to secure the plate thereto.

3. The guide structure according to claim 2, wherein the plate further includes a bent portion, the bent portion configured to extend through the slot to thereby connect the second end to a portion of the plate extending along the exterior of the at least one of the frame and the airbag assembly.

4. The guide structure according to claim 3, wherein the bent portion is configured as a stepped portion separating the second end from the portion of the plate extending along the exterior of the at least one of the frame and the airbag assembly.

5. The guide structure according to claim 4, wherein the second end extends away from the first end within the interior of the at least one of the frame and the seat assembly, and the second end, the bent portion, and the portion of the plate extending along the exterior of the at least one of the frame and the airbag assembly are formed so as to be contiguous.

6. The guide structure according to claim 1, further comprising another sheet connected to the plate, the other sheet configured to thereby guide deployment of the airbag assembly, wherein the plate has a bend such that a first portion of the plate to which the sheet is connected is angled from a second portion of the plate to which the other sheet is connected.

7. The guide structure according to claim 6, wherein the first portion of the plate is at an approximately normal angle to the connected sheet and the second portion of the plate is at an approximately normal angle to the connected other sheet.

8. The guide structure according to claim 1, wherein the plate is configured to provide a grounding path to the seat frame via at least one of the first end and the second end.

9. The guide structure according to claim 1, wherein the sheet is configured to be wrapped around the plate such that a portion of the plate is at least partially covered by the sheet, and a portion of the sheet is configured to be wrapped around the plate so as to overlap and attach to another portion thereof, thereby securing the sheet around the plate.

10. The guide structure according to claim 9, wherein the portion of the sheet is configured to be sewn to the other portion thereof.

11. An elongated plate for use with a deployable airbag assembly of a vehicle seat, the vehicle seat having a frame extending therein, the plate configured to be connected to at least one of the frame and the airbag assembly such that the plate extends along an exterior thereof, and a sheet being configured to be connected to the plate to thereby guide deployment of the airbag assembly, the plate comprising:
   a first end configured to be connected to the at least one of the frame and the airbag assembly by a fastener; and
   a second end configured to be inserted through a slot in the at least one of the frame and the airbag assembly so as to be disposed within an interior thereof.

12. The elongated plate according to claim 11, wherein the second end is configured to be hooked on the slot so as to secure the plate thereto.

13. The elongated plate according to claim 12, wherein the plate further includes a bent portion, the bent portion configured to extend through the slot to thereby connect the second end to a portion of the plate extending along the exterior of the at least one of the frame and the airbag assembly.

14. The elongated plate according to claim 13, wherein the bent portion is configured as a stepped portion separating the second end from the portion of the plate extending along the exterior of the at least one of the frame and the airbag assembly.

15. The elongated plate according to claim 14, wherein the second end extends away from the first end within the interior of the at least one of the frame and the seat assembly.

16. The elongated plate according to claim 15, wherein the second end, the bent portion, and the portion of the plate extending along the exterior of the at least one of the frame and the airbag assembly are formed so as to be contiguous.

17. The elongated plate according to claim 11, wherein the plate is configured to provide a grounding path to the seat frame via at least one of the first end and the second end.

18. The elongated plate according to claim 11, wherein the sheet is configured to be wrapped around the plate such that a portion of the plate is at least partially covered by the sheet.

19. The elongated plate according to claim 18, wherein a portion of the sheet is configured to be wrapped around the plate so as to overlap and be sewn to another portion thereof, thereby securing the sheet around the plate.

20. A method of installing a guide structure for use with a deployable airbag assembly in a vehicle seat, the vehicle seat having a frame extending therein, the method including:
   connecting an elongated plate to at least one of the frame and the airbag assembly such that the plate extends along an exterior thereof, the plate including:
   a first end configured to be connected to the at least one of the frame and the airbag assembly by a fastener; and
   a second end configured to be inserted through a slot in the at least one of the frame and the airbag assembly so as to be disposed within an interior thereof;
   wrapping a portion of a sheet around an inboard side of the plate such that a portion of the plate is partially covered by the overlapping sheet; and
   attaching the sheet to another portion thereof to secure the sheet around the plate, the sheet configured to thereby guide deployment of the airbag assembly.

* * * * *